United States Patent
Hsu et al.

(10) Patent No.: US 7,196,871 B2
(45) Date of Patent: Mar. 27, 2007

(54) HEAD FOR PERPENDICULAR RECORDING WITH A FLOATING TRAILING SHIELD

(75) Inventors: Yimin Hsu, Sunnyvale, CA (US); Quang Le, San Jose, CA (US); Mason Lamar Williams, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 424 days.

(21) Appl. No.: 10/671,639

(22) Filed: Sep. 26, 2003

(65) Prior Publication Data

US 2005/0068669 A1 Mar. 31, 2005

(51) Int. Cl.
*G11B 5/31* (2006.01)
*G11B 5/11* (2006.01)

(52) U.S. Cl. .................. 360/125; 360/126; 360/128

(58) Field of Classification Search ............. 360/126, 360/125, 317, 319, 121, 122, 128
See application file for complete search history.

(56) References Cited

U.S. PATENT DOCUMENTS

| | | | |
|---|---|---|---|
| 4,731,157 A | | 3/1988 | Lazzari |
| 5,075,956 A * | | 12/1991 | Das ........................... 360/122 |
| RE33,949 E | | 6/1992 | Mallary et al. |
| 5,196,976 A | | 3/1993 | Lazzari |
| 5,408,373 A | | 4/1995 | Bajorek et al. |
| 5,550,691 A | | 8/1996 | Hamilton |
| 6,407,891 B1 * | | 6/2002 | Chang et al. .............. 360/317 |
| 6,531,202 B1 | | 3/2003 | Litvinov et al. |
| 6,809,899 B1 * | | 10/2004 | Chen et al. ................. 360/317 |
| 6,842,313 B1 * | | 1/2005 | Mallary ....................... 360/317 |
| 6,894,856 B2 * | | 5/2005 | Nakamura et al. ............ 360/55 |
| 6,950,277 B1 * | | 9/2005 | Nguy et al. ................. 360/125 |
| 2002/0034043 A1 | | 3/2002 | Okada et al. |
| 2002/0176214 A1 | | 11/2002 | Shukh et al. |
| 2003/0043513 A1 | | 3/2003 | Lin |
| 2003/0117749 A1 * | | 6/2003 | Shukh et al. ............... 360/317 |
| 2003/0151850 A1 | | 8/2003 | Nakamura et al. |

OTHER PUBLICATIONS

M. Mallory et al. "One Terabit per Square Inch Perpendicular Recording Conceptual Design," IEEE Transactions on Magnetics, vol. 38, No. 4, Jul. 2002, pp. 1719ff.

* cited by examiner

*Primary Examiner*—Craig A. Renner
(74) *Attorney, Agent, or Firm*—G. Marlin Knight

(57) ABSTRACT

Heads for perpendicular recording using a floating-trailing shield as part of the magnetic circuit for writing magnetic domains in the recording media are described. The floating-trailing shield is separated from the main pole piece by a layer of non-magnetic material along its entire length and the air bearing surface of the floating-trailing shield is substantially larger than that of the main pole piece. The reluctance between the trailing shield and the underlayer in the recording medium is made so low that both are at the same magnetomotive force (or potential), so that no direct connection is needed between the floating-trailing shield and the yoke. When the head is used in a storage system with a magnetic recording medium with a soft underlayer, the floating-trailing shield is, in effect, magnetically shorted to the return pole piece during recording.

12 Claims, 5 Drawing Sheets

HEAD FOR PERPENDICULAR RECORDING WITH A FLOATING TRAILING SHIELD

FIELD OF THE INVENTION

The invention relates to magnetic thin film heads for perpendicular recording and more particularly to magnetic poles and shields used in such heads and to storage devices using such heads.

BACKGROUND OF THE INVENTION

In a typical prior art magnetic disk recording system a slider containing magnetic transducers for reading and writing magnetic transitions is supported by a suspension as it flies above the disk that is being rotated by a spindle motor. The disk includes a plurality of thin films and at least one ferromagnetic thin film in which the recording (write) head records the magnetic transitions in which information is encoded. The magnetic domains in the media on can be written longitudinally or perpendicularly. The read and write head portions of the slider are built-up in layers using thin film processing techniques. Typically the read head is formed first, but the write head can also be fabricated first. The conventional write head is inductive.

In a disk drive using perpendicular recording the recording head is designed to direct magnetic flux through the recording layer in a direction which is perpendicular to the plane of the disk. Typically the disk for perpendicular recording has a hard magnetic recording layer and a magnetically soft underlayer. During recording operations using a single-pole type head, magnetic flux is directed from the main pole of the recording head perpendicularly through the hard magnetic recording layer, then into the plane of the soft underlayer and back to the return pole in the recording head. The shape and size of the main pole piece and associated shields are the primary factors in determining the track width.

U.S. Pat. No. 6,531,202 to Litvinov, et al. is an example of a magnetic recording medium for perpendicular or vertical recording. The medium includes a a magnetically soft underlayer deposited on the substrate. Suitable soft magnetic materials for the underlayer are said to include CoFe and alloys thereof, FeAlN, NiFe, CoZrNb and FeTaN, with CoFe and FeAlN being preferred soft materials. A magnetically hard recording layer is deposited on the soft underlayer. Suitable hard magnetic materials for the recording layer are said to include multilayers of Co/Pd or Co/Pt, L10 phases of CoPt, FePt, CoPd and FePd and hcp Co alloys, with such multilayers and L10 phases being preferred hard materials.

In U.S. published application Ser. No. 2003/0151850 by Nakamura, et al., a single pole head is described which has the main pole down-track. The main pole is composed of at least two portions where the width of the first portion continuously increases from the up-track side to the down-track side in the direction of the moving medium and the width of the second portion is the same as the width of the first portion's down-track edge in the direction of the moving medium and is constant from the up-track side to the down-track side in the medium moving direction. This is said to prevent the recording magnetic field strength from decreasing at the track edge and increases the effective track width while suppressing side-writing, thereby, realizing a magnetic recording disk apparatus with a high track density.

In U.S. Pat. No. RE33,949 to Mallary, et al. a single pole head for perpendicular recording is described which includes what is called a "downstream shield" (down-track) that is connected to the write pole at the back and separated from the write pole by a small gap at the ABS. The ABS face of the shield is designed to be many times as large as the face of the write pole section so that the density of the flux from the tip is sufficient to effect a vertical recording while the density of the flux passing into the downstream magnetic shield is low so a previously recorded pattern is not reversed or weakened.

A single pole head for perpendicular recording with the trailing shield design improves field gradients at the expense of field strength. In prior art, the trailing shield design requires either 1) a reverse flying air bearing design, or 2) the write head fabricated before the read head, or 3) elaborated processing steps to connect the trailing shield to the return pole.

SUMMARY OF THE INVENTION

Heads for perpendicular recording using a floating-trailing shield as part of the magnetic circuit for writing magnetic domains in the recording media will be described. The floating-trailing shield is separated from the main pole piece by a layer of non-magnetic material along its entire length and the air bearing surface of the floating-trailing shield is substantially larger than that of the main pole piece. The reluctance between the trailing shield and the underlayer in the recording medium is made so low that both are at the same magnetomotive force (or potential), so that no direct connection is needed between the floating-trailing shield and the yoke. When the head is used in a storage system with a magnetic recording medium with a soft underlayer, the floating-trailing shield is, in effect, magnetically shorted to the return pole piece during recording. A planar floating-trailing shield according to the invention improves field gradients in the same way that a trailing shield that is shorted magnetically to the main pole piece does. The planar floating-trailing shield simplifies the processing steps needed to incorporate the trailing shield feature, since the numerous processing steps required to connect the trailing shield to the return pole piece are obviated. In a second embodiment of the invention the floating-trailing shield extends around the sides of the main pole piece to reduce the off-track magnetic field.

DETAILED DESCRIPTION OF THE INVENTION AND THE PREFERRED EMBODIMENTS

The floating-trailing shield of the invention can be used with a variety of head designs for perpendicular recording. From the finite element modeling, the floating-trailing shield, at the presence of the soft underlayer, reduces the fringing field and improves the field gradient in the down-track direction. The improvement implies better linear recording density. In the cross-track direction, the floating trailing shield also improves the fringing field, implying better written track definition. This design is compatible with the conventional head fabrication flows and a reverse flying air-bearing is not required.

The floating-trailing shield is completely separated from the main pole piece by non-magnetic material. The floating-trailing shield is said to be "floating" in respect to the main pole piece even though the non-magnetic gap material between the main pole and the trailing shield provides a gap in which a longitudinal field is established by the magnetomotive force provided by the current in the head coil and the thickness of that gap is used to control the flux which crosses that gap. There are two advantages to the presence of a longitudinal field (Hx) in addition to the main perpendicular writing field (Hy). A tilted field (which is formed by the vector sum of Hx and Hy) can more easily switch perpendicularly oriented grains in the magnetic recording medium according to the Stoner-Wohlfarth switching curves; and a larger derivative of dHy/dx can be obtained because the larger Hx allows a larger dHx/dy and by the Maxwell curl law, dHy/dx=dHx/dy in places where there is no current density. Thus, there is a controlled reluctance across the gap between the floating-trailing shield and the main pole piece. The inventors have discovered that it is not necessary to connect the trailing shield directly to the return pole with a magnetic circuit under certain conditions which will be described herein. Under the prescribed conditions the floating shield will be at the same magnetomotive potential as the return pole. The reluctance between the underlayer of the recording medium and the return pole (P1 or auxiliary pole) is relatively low in the typical head designed for perpendicular recording. If the reluctance between the trailing shield and the underlayer in the recording medium is made so low that they are both at the same magnetomotive force (or potential), then no direct connection is needed.

Figure 1:
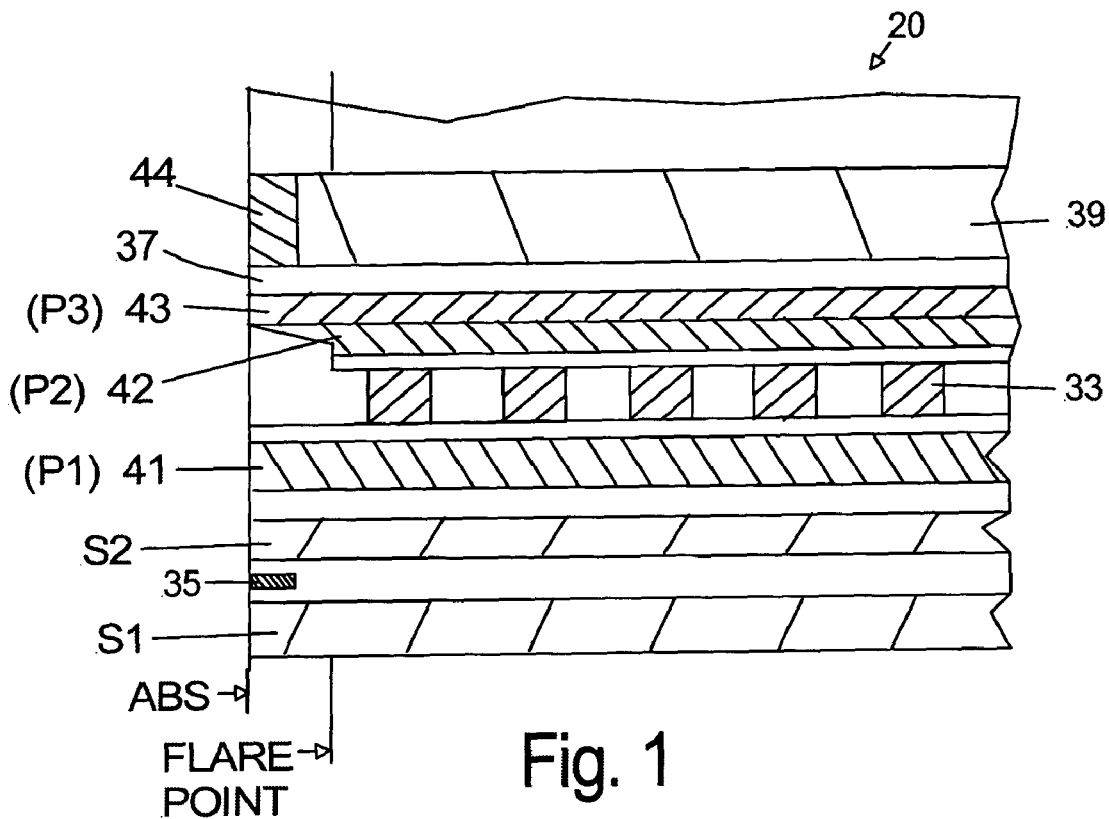
FIG. 1 is an illustration of a section, perpendicular to the ABS, of a head according to a first embodiment of the invention.

FIG. 1 is an illustration of a section, perpendicular to the ABS, of a head 20 according to a first embodiment of the invention. The cross-hatching is not intended to represent the type of materials, but rather to provide a visual distinction among the elements. The ABS is on the left-hand side. As shown the layers are formed from the bottom up, so the read head portion is formed first in this design and can be packaged in forward flying air-bearing slider. The read sensor 35 is flanked by magnetic shields S1 and S2. The ferromagnetic write elements begin with P1 41 which is the return pole piece. P1 41 and P2 42 are magnetically connected through the center of the coil 33 to complete the yoke. The coil 33 passes between P1 and P2 and around the back of the yoke (not shown) to form the electromagnet. P1 extends to the ABS without tapering, but P2 starts tapering a small distance before the ABS and either ends or is reduced to an insignificant size at the ABS. It is preferable for P2 not to extend to the ABS. so that only the shape of P3 43 needs to be controlled. P3 is formed directly on top of and in contact with P2. P3 extends to the ABS and forms the main pole piece of the write head at the ABS. Although not visible in this view P3 is narrow near the ABS. but flares to a much wider dimension beginning at approximately the point where P2 reaches its full thickness as shown in FIG. 1 as the flare point. Above P3 a layer of non-magnetic material 37 is deposited. The non-magnetic material can be a conductive metal, but can also be alumina or another insulating material. Above the layer of non-magnetic material 37 the ferromagnetic floating-trailing shield 44 is formed at the ABS and extends a short distance back from the ABS. The floating-trailing shield 44 is down-track (trails) the main pole piece 43. since the magnetic recording medium will be moving from bottom to top as FIG. 1 is oriented. The dimensions of the floating-trailing shield and the separation between the floating-trailing shield and P3 are important to the performance of the design. The area of the floating-trailing shield at the ABS is selected so that the reluctance between the floating-trailing shield and the ferromagnetic medium is substantially less than the reluctance between the main pole P3 and the floating-trailing shield—by at least a factor often approximately. The thickness (depth) of the floating-trailing shield 44 perpendicular to the ABS is constrained by the fact that the write field is reduced with increased thickness. Preferably the thickness of the floating-trailing shield will be less than the distance to the flare point, i.e., will be less than the length of the tip of the main pole piece P3. The floating-trailing shield must be thick enough not to saturate during operation.

The distance between the main pole piece P3 and the floating-trailing shield is also an important design parameter. This distance should be approximately the same as the distance from the main pole piece P3 43 and the soft underlayer of the medium during operation.

The space behind the floating-trailing shield is filled with a non-magnetic material 39. Although not shown, a thin film protective overcoat will be needed if any of the materials comprising the head are subject to corrosion or smearing. In the following, references to the ABS will be used to mean the plane of the head labeled as the ABS in FIG. 1 regardless of whether an overcoat is used.

Figure 2:
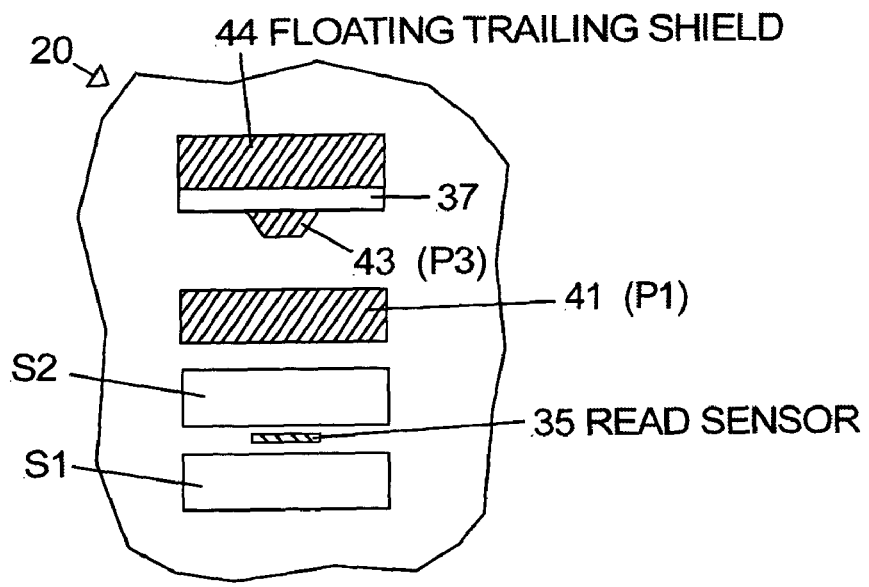
FIG. 2 is an illustration of an embodiment a head according to a first embodiment of the invention as viewed from the ABS.

FIG. 2 illustrates a view from the ABS of selected elements of a head according to the invention similar to the head of FIG. 1. The floating-trailing shield 44, the main pole piece P3 43 and the return pole piece P1 41 are disposed generally along a straight line on the ABS. The floating-trailing shield 44 is rectangular in this embodiment, but other shapes are possible so long as the reluctance criterion described above is met. In this embodiment the shape of P3 at the ABS is trapezoidal with the base being nearest to the floating-trailing shield 44. The shape of P3 is not critical to the functioning of the floating-trailing shield 44, so other shapes can be used.

Figure 7:
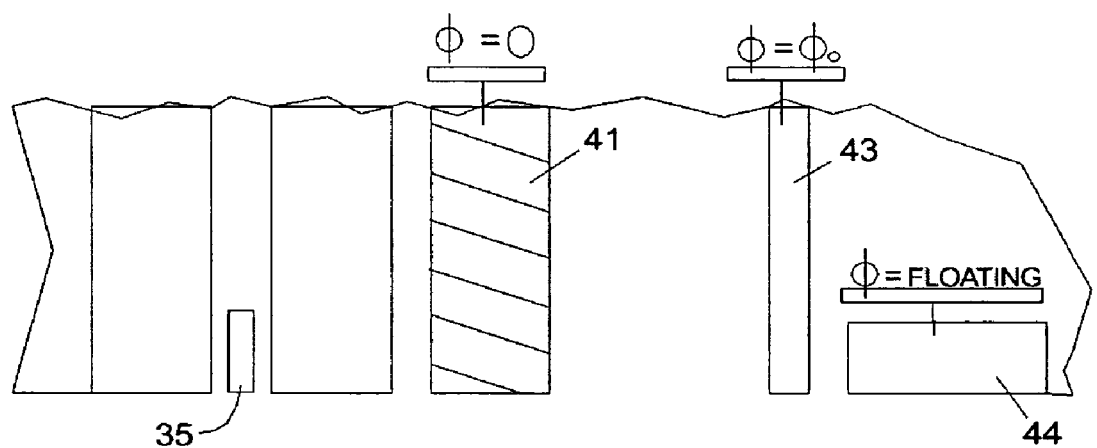
FIG. 7 is an illustration of a section of a head according to the invention taken perpendicular to the ABS and shows the magnetic potentials when no magnetic medium is present.
Figure 8:
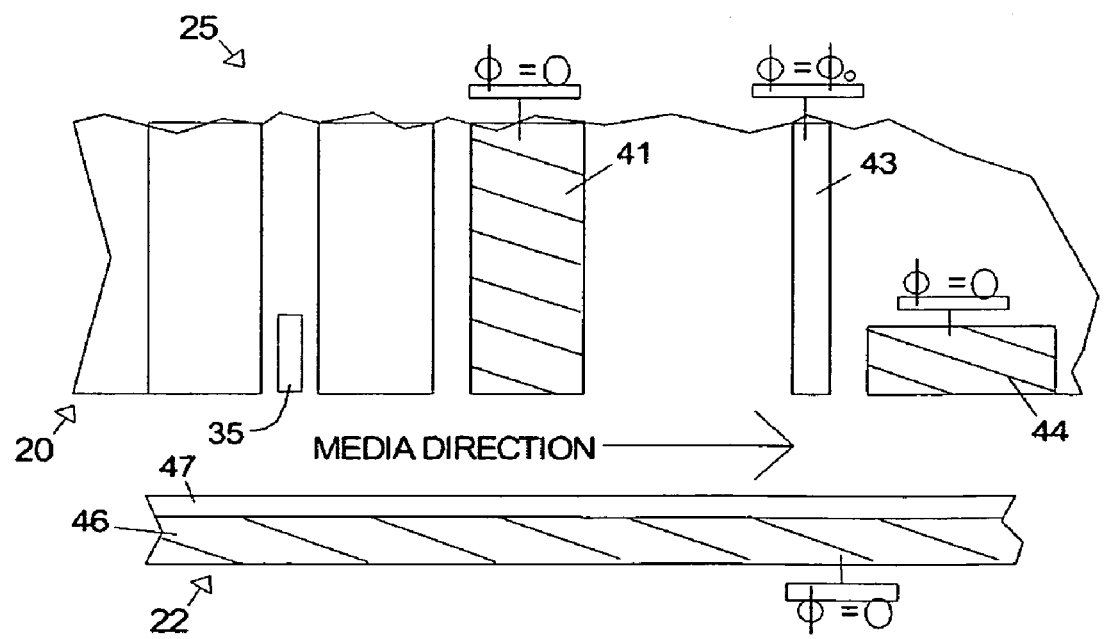
FIG. 8 is an illustration of a storage device such as a disk drive including a head according to the invention and a magnetic medium with a magnetically soft underlayer. The section of the head and medium is taken perpendicular to the ABS and shows the magnetic potentials when the magnetic medium is present during operation.

FIGS. 7 and 8 are illustrations of a section of a head according to the invention taken perpendicular to the ABS.

These figures show the relative magnetomotive potentials ($\phi$ and $\phi_0$) of the return pole piece P1 41, the main pole piece P3 43 and the floating-trailing shield 44. In FIG. 7 illustrates the potentials when no magnetic medium is present. In this case the floating-trailing shield is, in fact, magnetically floating. FIG. 8 illustrates magnetic storage device 25 such as disk drive with a head according to the invention and a magnetic medium 22 with a soft underlayer 46 confronting the head 20. In this case the floating-trailing shield 44 is, in effect, shorted to the soft underlayer 46. The return pole piece P1 41, the floating-trailing shield 44 and the soft underlayer 46 are all at zero. The hard ferromagnetic recording layer 47 does not play a significant role in the magnetic circuit analysis.

Figure 3:
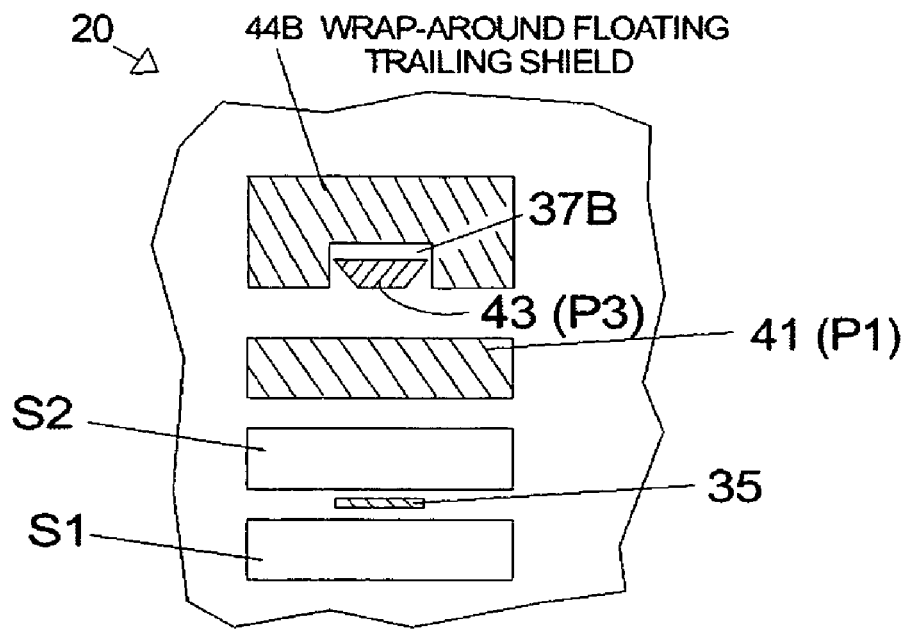
FIG. 3 is an illustration as viewed from the ABS of an embodiment a head according to a second embodiment of the invention with a wrap around shield.

FIG. 3 illustrates a view from the ABS of selected elements of a head according to a second embodiment of the invention. In this embodiment the floating-trailing shield 44B wraps around the sides of P3. Stated another way, P3 is positioned in a channel in the wrap-around floating-trailing shield 44B. The non-magnetic material 37B separates P3 from the floating-trailing shield 44B on three sides. The advantage of the wrap-around floating-trailing shield 44B is that it reduces the side writing fields and helps to narrow the track width.

Figure 4:
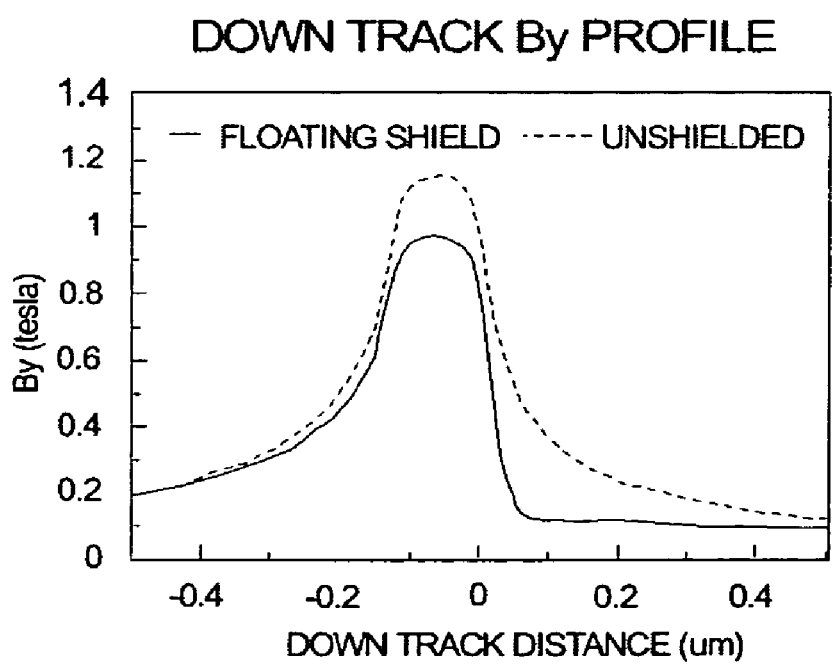
FIG. 4 is a graph of finite element modeling results showing By versus down-track distance of an embodiment a head according to a first embodiment of the invention compared with a head without the floating-trailing shield.
Figure 5:
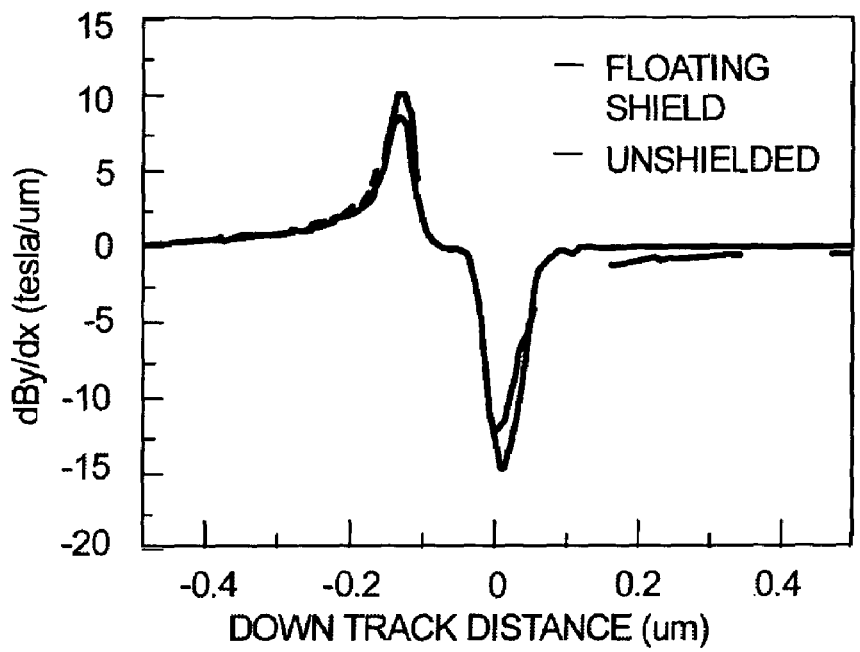
FIG. 5 is a graph of finite element modeling results showing dBy/dx versus down-track distance of an embodiment a head according to a first embodiment of the invention compared with a head without the floating-trailing shield.
Figure 6:
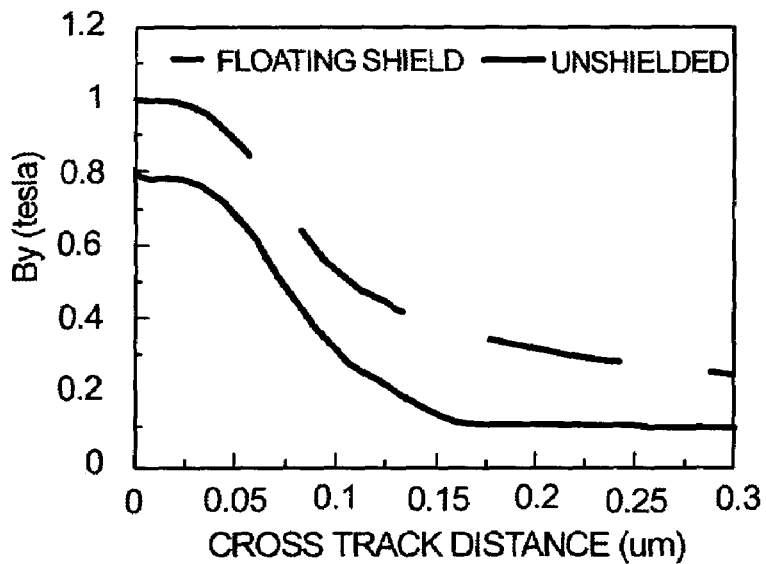
FIG. 6 is a graph of finite element modeling results showing the cross track profile of By for a head according to a second embodiment of the invention embodying the wrap around shield according to the invention compared with a non-shielded head.
Figure 9:
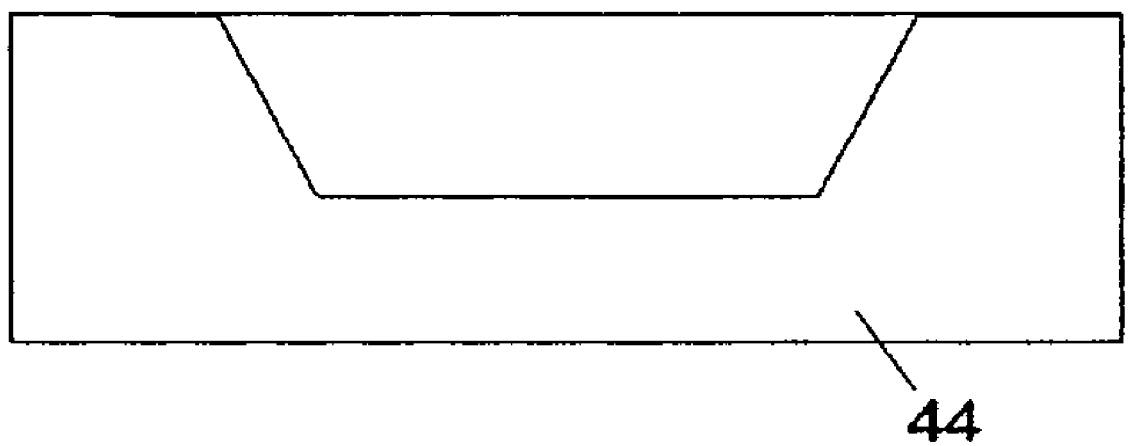
FIG. 9 is an illustration of the shape of the floating-trauma shield in an embodiment of the invention. The section is taken perpendicular to the ABS.

The data presented in FIGS. 4–6 was obtained by finite element modeling using commercially available software. The relevant parameters for the modeling were a pole of width 120 nm, thickness 120 nm, with a tapered leading edge, with a throat of 400 nm, a gap to the trailing shield of 50 nm and a trailing shield throat (thickness perpendicular to ABS near the pole) of 50 nm. The thickness of the shield on the wafer would be 200 nm minimum (in the down-track direction) and the width of the floating shield was about 15 microns in the cross-track direction. These parameters are appropriate for use with a head-to-underlayer spacing of 50 nm, and should be scaled for use with other values of head-to-underlayer spacing proportionately. Optionally the thickness of the shield perpendicular to the ABS may be increased for distances greater than about 1 micron from the center of the main pole piece (track) to improve mechanical integrity and allow for some non-planarity of lapping, but it is not essential to the working of the invention. FIG. 9 illustrates the alternative embodiment where the floating-trailing shield 44 is thicker on the sides than in the center in a section view perpendicular to the ABS. Accordingly in this model the off-center thickness of the floating-trailing shield was increased to about 200 nm.

FIG. 4 is a graph of finite element modeling results showing the magnetic flux density By versus down-track distance of an embodiment a head according to the first embodiment of the invention compared with a head without the floating-trailing shield. The graph shows that floating-trailing shield decreases the magnetic flux density in the down-track direction. The maximum reduction is approximately 0.3 tesla at about 0.07 um.

FIG. 5 is a graph of finite element modeling results showing the rate of change of magnetic flux density dBy/dx versus down-track distance of an embodiment a head according to the first embodiment of the invention compared with a head without the floating-trailing shield. The data show that the rate of change in the magnetic flux density is greater for the floating-trailing shield of the invention.

The wrap-around floating-trailing shield 44B is expected to perform similarly to the non-wrap-around version in the down-track direction. In the cross-track direction the wrap-around floating-trailing shield can provide superior results although at the cost of increased fabrication complexity. For the wrap-around floating-trailing shield, the side gap should be in the range of 1 to 2 times the head-to-underlayer spacing with a preferred value being 1.5 times the head-underlayer spacing. Larger side gap distances provide little reduction of writing on the adjacent tracks; smaller side gap distances reduce the available write flux excessively. FIG. 6 is a graph of the finite element modeling cross track profile of magnetic flux density (By) for a head embodying the wrap around floating-trailing shield according to the invention and a head without shielding. The magnetic flux density is lowered by approximately 0.2 tesla over most of the 0.3 um range modeled.

A head according to the invention can be fabricated using standard thin film fabrication techniques. The invention has been described with respect to particular embodiments, but other uses and applications for the ferromagnetic structure according to the invention will be apparent to those skilled in the art.

The invention claimed is:

1. A thin film magnetic recording head for use with a magnetic recording medium comprising:
    a yoke including a main pole piece of ferromagnetic material and a return pole piece of ferromagnetic material; and
    a floating-trailing shield of ferromagnetic material positioned on an opposite side of the main pole piece from the return pole piece, the floating-trailing shield being separated from the yoke by non-magnetic material, and the floating-trailing shield having an off-center thickness perpendicular to an air-bearing surface that is larger than a thickness at a center of the floating-trailing shield as viewed from the air-bearing surface.

2. A thin film magnetic recording head of claim 1 wherein the floating-trailing shield has a first area on the air-bearing surface that is larger than a second area of the main pole piece on the air-bearing surface and the first area is selected to generate a first magnetic reluctance between the main pole piece and the shield that is substantially greater than a second magnetic reluctance between the shield and a magnetically soft underlayer in the magnetic recording medium.

3. The thin film magnetic recording head of claim 1 wherein the main pole piece has a first area on the air-bearing surface of the head and the floating-trailing shield has a second area on the air-bearing surface and the second area is substantially greater than the first area.

4. The thin film magnetic recording head of claim 1 wherein the main pole piece has a tip that extends from the air-bearing surface of the head to a flare point on the main pole piece; and
    the floating-trailing shield has a thickness through the center of the floating-trailing shield measured perpendicular to the air-bearing surface that is less than a length of the tip from the air-bearing surface to the flare point.

5. The thin film magnetic recording head of claim 1 further comprising a layer of electrically conductive metal separating the floating-trailing shield from the main pole piece.

6. The thin film magnetic recording head of claim 1 wherein the floating-trailing shield extends around first and second sides of the main pole piece forming first and second side gaps.

7. The thin film magnetic recording head of claim 6 wherein the first and second side gaps are approximately one to two times a predetermined distance from the air-bearing surface to a soft underlayer in the magnetic recording medium.

8. A thin film magnetic recording head for use with a magnetic medium with a magnetically soft underlayer comprising:
- a main pole piece of ferromagnetic material;
- a return pole piece of ferromagnetic material;
- a layer of electrically conductive metal adjacent to the main pole piece on an opposite side of the main pole piece from the return pole piece; and
- a floating-trailing shield of ferromagnetic material positioned adjacent to the layer of electrically conductive metal so that the layer of electrically conductive metal separates the floating-trailing shield from the main pole piece, the floating-trailing shield having an off-center thickness perpendicular to an air-bearing surface that is larger than a thickness at a center of the shield as viewed from the air-bearing surface.

9. The thin film magnetic recording head of claim 8 wherein a first magnetic reluctance between the main pole piece and the shield that is substantially greater than a second magnetic reluctance between the floating-trailing shield and the magnetically soft underlayer.

10. The thin film magnetic recording head of claim 9 wherein the first magnetic reluctance is approximately ten times the second magnetic reluctance.

11. The thin film magnetic recording head of claim 8 wherein the main pole piece has a first area at an air-bearing surface of the head and the floating-trailing shield has a second area on the air-bearing surface and the second area is substantially greater than the first area.

12. The thin film magnetic recording head of claim 8 wherein the main pole piece has a tip that extends from an air-bearing surface of the head to a flare point on the main pole piece; and
- the floating-trailing shield has a thickness measured perpendicularly to the air-bearing surface that is less than a length of the tip from the air-bearing surface to the flare point.

\* \* \* \* \*